May 24, 1955 E. MOSHER Re. 24,008
TUBE SHIELD FOR SPRAY GUNS
Original Filed March 8, 1951
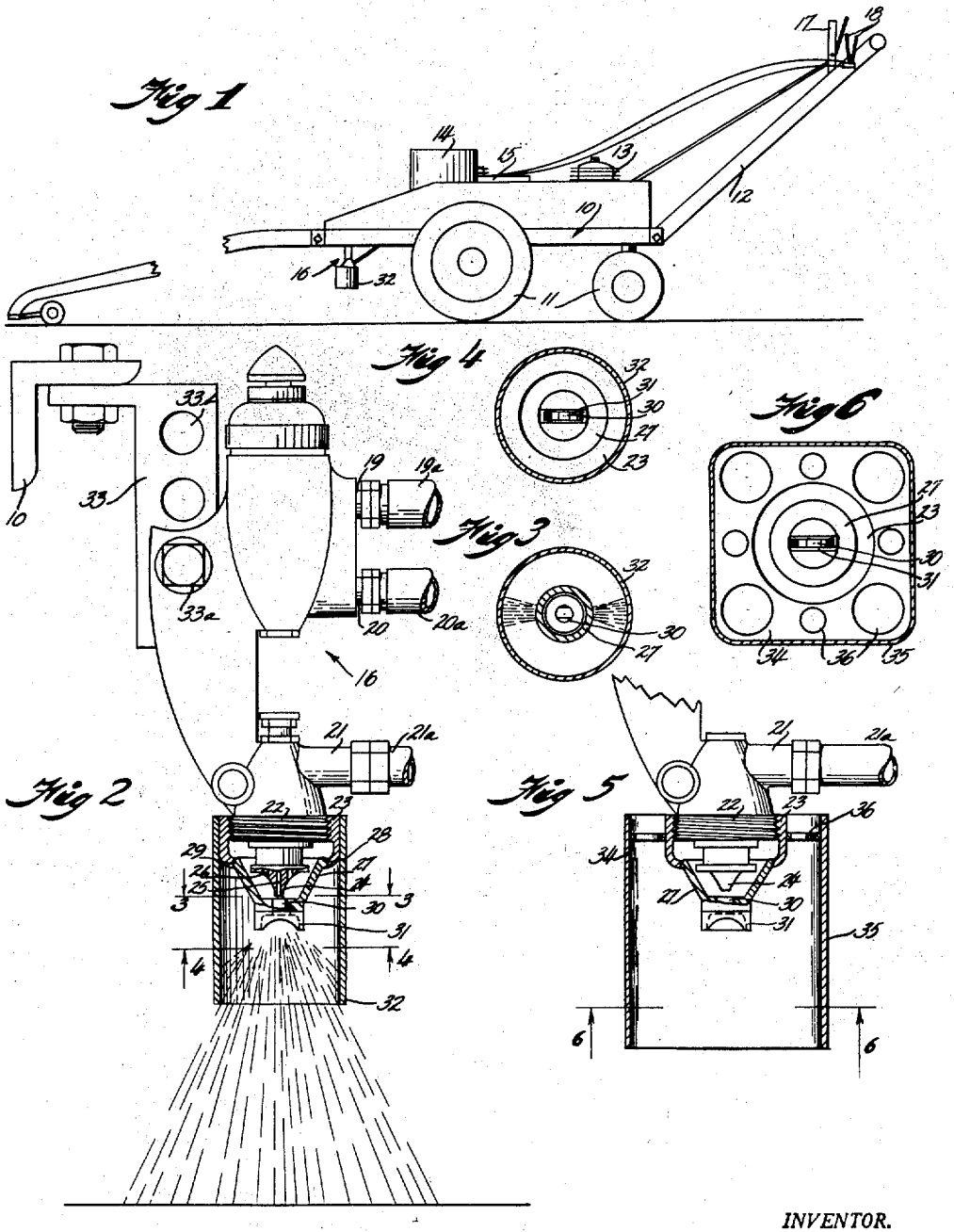
INVENTOR.
EDWARD MOSHER
BY
Robert R. Kummel
ATTY United States Patent Office Re. 24,008
Reissued May 24, 1955

24,008

TUBE SHIELD FOR SPRAY GUNS

Edward Mosher, Detroit, Mich., assignor to Wald Industries, Inc., Huntington, Pa., a corporation of Pennsylvania Original No. 2,647,793, dated August 4, 1953, Serial No. 214,456, March 8, 1951. Application for reissue July 6, 1954, Serial No. 441,701

11 Claims. (Cl. 299—28.5)

Matter enclosed in heavy brackets [ ] appears in the original patent but forms no part of this reissue specification; matter printed in italics indicates the additions made by reissue.

The present invention relates to improvements in traffic lane marking machines and more particularly to a tube shield for use with a paint gun of any suitable or well known type, for directing a mixture of paint and air upon the surface of the road so that upon forward movement of the machine, a strip or ribbon of paint having well defined lateral edges is formed.

In traffic lane marking machines illustrative of the prior art, it is customary to provide a pair of shields of substantially rectangular shape for running on the surface of the road in parallel and spaced apart relationship for trapping the spray of paint therebetween and for forming upon forward movement of the machine a strip or ribbon of paint. An associated lifting device is also provided for lifting the shields from an operative to a non-operative position. The use of shields of this type has never proven to be a successful expedient for defining the width of a paint strip, the shields having a tendency to collect dried paint thereon which must be periodically scraped therefrom, so as to prevent a wavy or blurred strip or a strip of insufficient width from forming. The shields of this type are also susceptible to obstructions or irregularities in the road which at times damage the shields sufficiently to necessitate the stoppage of the painting operation until the shields are repaired or replaced. It is further necessary in the successful operation of machines employing shields of this type that the operator be highly skilled, since the quality of the paint stripping job is partly determinative upon the ability of the operator to lift the shields into a non-operative position after the spray of paint from the paint gun has been interrupted without having the lateral edges of the line drawn past the intended finishing point. In certain sections of the country, the Southwest for instance, shields of this type have proven rather hazardous, sparks caused by running the shields upon the surface of certain types of roads having been responsible for many instances of paint combustion.

An object of the present invention therefore is to improve the operation and construction of machines of this type.

A further object is to provide a tube shield, fixed as to height above the surface of the road for directing a spray of paint upon the surface of the road, which upon forward movement, will form a ribbon or strip of paint having well defined lateral edges and of substantially uniform width and hue.

Another object of the invention is to provide a tube shield which is simple and compact in construction, efficient in operation, and which can be manufactured at low cost.

These and other objects and advantages of the invention will be apparent from the following description and the drawings in which:

Fig. 1 is a side elevation of a traffic lane marking machine embodying the present invention.

Fig. 2 is a side elevation, slightly enlarged, of certain structure shown in Fig. 1, showing the present invention in combination with the paint gun.

Fig. 3 is a view taken on line 3—3 of Fig. 2.

Fig. 4 is a view taken on line 4—4 of Fig. 2.

Fig. 5 is a view similar to Fig. 2, showing a modification of the present invention with parts removed.

Fig. 6 is a view taken on line 5—5 of Fig. 5.

Referring to the drawings, Fig. 1 shows a traffic lane marking machine of any well known or suitable construction embodying in the present instance, a frame or carriage 10 movably supported on wheels 11, and a rearwardly extending handle 12 by which the operator of the machine controls the steering thereof. A suitable power plant 13 is carried on the carriage 10 and is operatively connected to one of the wheels 11 for transmitting thereto in any conventional or suitable manner motive power for driving the machine forwardly. A paint container 14 and an air compressor 15 are provided on the carriage 10 and are operatively connected to a paint *generating means which is illustrated in the form of a paint* gun 16 of any conventional or suitable construction for well known purposes. Suitable controls 17 and 18 are positioned on handle 12 within easy reach of the operator for regulating the forward travel of the machine and the operation of paint gun 16 respectively, all of the above being of conventional or well known construction, the present invention concerning itself with means fixed as to height above the surface of the road for directing a spray of paint thereupon so as to form upon forward movement of the machine a strip or ribbon of paint of uniform width and hue and having well defined lateral edges, as will appear hereinafter.

The paint gun 16, Figs. 2, 3, and 4, can be of any conventional construction as previously suggested and includes in the present instance air inlets 19 and 20 and a paint inlet 21, air inlets 19 and 20 being connected to compressor 15 by suitable conduits 19a and 20a, and paint inlet 21 being connected to container 14 by conduit 21a. A threaded portion 22 is formed adjacent the lower end of gun 16 and threadingly accommodates thereon a ring 23. A spout 24 of well known form is provided and has formed therein the usual paint port 25, and air ports 26, paint port 25 being connected to paint inlet 21 by well known construction, not shown, and air ports 26 being connected to air inlet 20 by well known construction, not shown, whereby upon operation of compressor 15, air forced through air ports 26 will atomize paint driven from port 25 so as to emit a stream or jet of paint spray or fog in a manner well known in the art. Inlet 19 is operatively connected with a piston or plunger, not shown and of no importance as far as the present invention is concerned, for preventing the passage of air from inlet 20 through air ports 26 for interrupting the emission of a paint spray from gun 16. The transmission of air through air inlet 19 for controlling the position of the plunger or piston is under control of the operator by means of control lever 18 as previously suggested and as well known in the art. The spout 24 is enclosed in a nozzle 27 of substantially truncated conical shape. The lower end of ring 23 is bent inwardly and has formed on the inner circumferential surface thereof a bearing surface 28 for reception therein of a complementary portion 29 formed on the upper circumferential surface of nozzle 27 for rotatably supporting nozzle 27 for rotation about an axis substantially coaxial with ring 23 and spout 24. Nozzle 27 is provided with the usual opening 30 and lips 31 for directing the spray of paint driven through opening 30 in a substantially fan-shape pattern, the nozzle 27 being positioned with respect to the gun 16 so that the width or base of the pattern of spray is directed across the surface of the road or transverse to the direction of travel of the machine.

The outer periphery of ring 23 in the present instance is knurled and a tube shield 32 is telescopically pressed thereon so as to encircle nozzle 27. Tube shield 32 in the present instance is of tubular construction and is substantially cylindrical in cross section and substantially coaxial with nozzle 24. In general the jet of paint spray emitted into the nozzle 27 is driven therefrom in a substantially fan-shaped pattern as previously suggested, the lateral limits of the fan-shaped pattern of spray gradually diminishing in density, so that if the gun were used for spraying directly upon the surface of the road, the strip or ribbon of paint that would be formed upon forward movement of the machine would lack any well defined edge, would diminish gradually in hue laterally from a centrally formed substantially well defined portion, and would be blurred and very unsatisfactory for traffic lane purposes. The tube shield 32 in the present instance extends sufficiently below the nozzle 27 to trap that portion of the paint spray which is thrown laterally from that portion of the fan shaped pattern of paint spray which is of substantially equal density so that the spray of paint driven downward past the bottom peripheral edge of the tube shield has a well defined lateral outline, that portion of the paint spray which is trapped by the inner circumferential surface of the shield tending, upon contact with the shield, to run downwardly until picked up by the spray which is driven downwardly out of the shield. More specifically the tube shield restricts the fan-shape pattern of paint spray emitted from the nozzle 27 so that only that portion of the fan-shaped pattern of spray being of substantially equal density is driven out of the tube shield 32, the spray being driven out of the tube shield with sufficient intensity so that the bottom peripheral edge of the tube shield cuts or forms a well defined lateral outline or limit to the pattern of spray.

The gun 16 is secured to a member 33 of the frame by means of a bolt or the like 33a so as to position the gun 16 so that the bottom of the shield is in substantially close proximity to the surface of the road, a distance of two inches from the bottom of the shield to the road producing a four inch line when used with a standard paint gun for traffic lane purposes, however, the exact position of the gun is best determined by experiment, consideration being given to the size of the tube shield, the width of line desired, and the size of the nozzle opening. Spaced openings 33b are formed in member 33 for permitting the gun 16 to be held in various positions with respect to the surface of the road, the width of the line increasing as the distance from the surface of the road to the tube shield is increased. It will be apparent that due to the relatively short distance between the end of the shield 32 and the road, that the spray of paint driven out of the tube will retain its well defined lateral limits until it strikes the road, the outer or surrounding air acting as an enveloping medium or wall tending to hold the paint spray together. It will also be apparent that while the paint spray driven out of nozzle 27 is directed in a fan-shaped pattern, the tube shield is capable of use with guns having nozzles which direct the paint therefrom in other patterns, conical for instance, however for road stripping purposes it has been found that the fan-shape paint pattern is preferable because the line formed is of substantially equal thickness and no overlapping of painting occurs. Figs. [4 and 5] *5 and 6* show a modification wherein a spacer 34 is press fitted on the ring 23 and a tube shield 35 of tubular construction of substantially rectangular cross-section, is secured thereto as by welding or the like, so as to encircle nozzle 27 in a position substantially coaxial therewith. Spaced openings 36 are formed in spacer 34 between tube shield 35 and ring 23 whereupon in operation, the suction created within the tube shield when the spray of paint is being driven therethrough, will draw air through openings 36 into the tube shield which helps to confine or bind together the mixture as it drives through the tube. This surge of air further aids in rapidly drying the paint once it is applied to the road surface.

Although particular embodiments of my invention have been described, it will be understood by those skilled in the art that the object of the invention may be attained by use of constructions different in certain respects from those disclosed without departing from the underlying principles of the invention; for instance, a tube shield having a cross-sectional shape other than circular or rectangular is considered as being within the limits of the invention. It is also appreciated that the bottom fore-and-aft portion of the tube shield can be broken away or notched without substantially detracting from its efficiency when used with a gun having a nozzle which emits a fan-shaped pattern of spray. I therefore desire by the following claims to include within the scope of my invention all such variations and modifications by which substantially the results of my invention may be obtained through the use of substantially the same or equivalent means.

Having thus described my invention, what I claim is:

1. In a traffic lane marking machine, a downwardly disposed paint gun carried by the machine at a predetermined distance from the surface of the road, and having means for the admission of paint and a motive agent and a plurality of discharge ports adjacent the lower end thereof for the emission of a spray of paint upon the surface of a road, said gun having formed adjacent the discharge ports a threaded portion which is substantially co-axial with respect to the spray of paint, a ring threadedly received on said threaded portion of said gun, a nozzle rotatably carried by said ring and including a downwardly extending conical portion enclosing said discharge ports, said nozzle having formed therein a discharge opening positioned axially with respect to the paint spray for directing the spray downwardly in a fan-shape pattern, a shield of tubular construction telescopically received by said ring and fixed to the outer circumference thereof against axial movement with respect thereto and extending downwardly therefrom for enclosing the spray of paint emitted from said nozzle, said shield being of sufficient length to confine and restrict the spray of paint within the shield so that only that portion of the spray of paint being of substantially equal density is driven from the shield, the bottom edge of the shield forming a well defined lateral outline to the spray of paint so as to form upon forward movement of the machine, a ribbon of paint having well defined lateral edges and of substantially equal hue.

2. In a traffic lane marking machine, a downwardly disposed paint gun carried by said machine at a predetermined distance from the surface of a road and having means for the admission of paint and a motive agent and a plurality of discharge ports at the lower end thereof for the emission of a spray of paint upon the surface of the road, said gun having formed adjacent the discharge ports a threaded portion which is substantially coaxial with respect to the spray of paint, a ring threadedly received on said threaded portion of said gun, a nozzle rotatably carried by said ring and including a downwardly extending conical portion enclosing said discharge ports, said conical portion having formed therein a discharge opening positioned axially with respect to the spray of paint for directing the spray downwardly in a fan-shape pattern, a tube shield of tubular construction, a spacer fixed on the inner circumference of said tube shield for telescopically fixing the tube shield with respect to the ring against axial movement so as to position the tube shield at a fixed distance from the surface of the road, said tube shield extending downwardly from said ring and being of a length sufficient to restrict and confine the spray of paint within the tube so that only that portion of the spray of paint being of substantially equal density is driven out of the tube shield, the bottom edge of the tube shield forming a [wall] *well* defined lateral outline, so as to form upon forward movement of the machine, a ribbon of paint having well defined lateral edges and of substantially equal hue.

3. The combination set forth in claim 2 further characterized by said spacer having openings formed therein whereby the suction created in said tube shield by the paint spray being driven therethrough will draw air therein for aid in confining the paint spray therein and driving the same thereout.

4. In a traffic lane marking machine, a downwardly extending paint gun carried by the machine, said gun having means for the admission of paint and a motive agent and discharge ports adjacent the lower end thereof for the emission of a spray of paint, said gun having formed adjacent the discharge ports a threaded portion substantially co-axial with respect to said spray of paint, a quick detachable tube shield for directing the spray downwardly in a fan-shape pattern having sharply defined lateral limits comprising a tubular member, a ring press fitted to the inner circumference of said tubular member adjacent the upper end thereof and threadedly received by said threaded portion of said gun so that said tubular member extends downwardly and is positioned substantially co-axial with respect to said spray of paint, and a nozzle rotatably carried by said ring and extending downwardly therefrom within said tubular member for enclosing the discharge ports, said nozzle having formed therein an opening for directing the spray of paint downwardly into said tubular member in a fan-shape pattern, and said tubular member being of a length sufficient to truncate said fan-shape spray so that the ribbon of paint formed on the surface of the road upon forward movement of the machine is of substantially equal hue and has sharply defined lateral limits.

5. In a traffic lane marking machine, a downwardly extending paint gun carried by said machine, said gun having means for the admission of paint and a motive agent and discharge ports adjacent to the lower end thereof for the emission of a spray of paint, said gun having formed adjacent the discharge ports a threaded portion substantially coaxial with respect to said spray of paint, a quick detachable tube shield for directing the spray downwardly in a fan-shape pattern having sharply defined lateral limits comprising a tubular member, a ring adapted to be threadedly received by the threaded portion of the gun, a spacer interconnected between the inner circumference of said tubular member adjacent the upper end thereof and the outer circumference of said ring whereby said tubular member is positioned substantially coaxial with respect to the spray of paint upon said ring being threadedly received by said threaded portion of said gun, and a nozzle rotatably carried by said ring and extending downwardly therefrom within said tubular member for enclosing the discharge ports, said nozzle having formed therein an opening for directing the spray of paint downwardly into said tubular member in a fan-shape pattern, and said tubular member being of a length sufficient to truncate said fan-shape spray so that the ribbon of paint formed on the surface of the road upon forward movement of the machine is of substantially equal hue and has sharply defined lateral limits.

6. The construction set forth in claim 5 further characterized by said spacer having openings formed therein whereby the suction created within said shield by the paint spray being driven therethrough will draw therein air for aiding in confining and restricting the spray of paint therein and for driving the same thereout.

7. In a traffic lane marking machine, a downwardly disposed paint gun carried by the machine at a predetermined distance from the surface of the road, and having means for the admission of paint and a motive agent and a plurality of discharge ports adjacent the lower end thereof for the emission of a spray of paint upon the surface of a road, said gun having formed adjacent the discharge ports a threaded portion which is substantially coaxial with respect to the spray of paint, a ring threadedly received on said threaded portion of said gun, a nozzle rotatably carried by said ring and including a downwardly extending conical portion enclosing said discharge ports, said nozzle having formed therein a discharge opening positioned axially with respect to the paint spray for directing the spray downwardly in a fan-shape pattern, a shield of tubular construction telescopically received by said ring and supported against axial movement with respect thereto and extending downwardly therefrom for enclosing the spray of paint emitted from said nozzle, said shield being of sufficient length to confine and restrict the spray of paint within the shield so that only that portion of the spray of paint being of substantially equal density is driven from the shield, the bottom edge of the shield forming a well defined lateral outline to the spray of paint so as to form upon forward movement of the machine, a ribbon of paint having well defined lateral edges and of substantially equal hue.

8. In a traffic lane marking machine, a downwardly disposed paint gun carried by the machine at a predetermined distance from the surface of the road, and having means for the admission of paint and a motive agent and a plurality of discharge ports adjacent the lower end thereof for the emission of a spray of paint upon the surface of a road, said gun having formed adjacent the discharge ports a threaded portion which is substantially coaxial with respect to the spray of paint, a ring threadedly received on said threaded portion of said gun, a nozzle rotatably carried by said ring and including a downwardly extending conical portion enclosing said discharge ports, said nozzle having formed therein a discharge opening positioned axially with respect to the paint spray for directing the spray downwardly in a fan-shape pattern, a shield of tubular construction telescopically received by said ring and supported against axial movement with respect thereto and extending downwardly therefrom for enclosing the spray of paint emitted from said nozzle, the diameter of said shield being substantially greater than the diameter of said ring, said shield being of sufficient length to confine and restrict the spray of paint within the shield so that only that portion of the spray of paint being of substantially equal density is driven from the shield, the bottom edge of the shield forming a well defined lateral outline to the spray of paint so as to form upon forward movement of the machine, a ribbon of paint having well defined lateral edges and of substantially equal hue.

*9. In a traffic lane line marking machine, a paint spray generating means including a body carried by said machine a predetermined distance from a surface to be marked, the longitudinal axis of said body being perpendicular to the surface to be marked, a generally tubular shield operatively associated with said generating means, the longitudinal axis of said shield being substantially coaxial with the longitudinal axis of the body of said generating means, the bottom edge of said shield being positioned substantially above said surface to be marked and forming means for defining the line to be sprayed on said surface in a predetermined width, the upper portion of said shield being provided with air admission means to admit air into the interior thereof and for aiding in confining the paint spray in its passage through said shield.*

*10. In a traffic lane line marking machine, a paint spray generating means carried by said machine a predetermined distance from a surface to be marked, a generally tubular shield operatively associated with said generating means, the longitudinal axis of said shield being substantially coaxial with the longitudinal axis of said generating means, the bottom edge of said shield being positioned substantially above said surface to be marked and forming means*

*for defining the line to be sprayed on said surface in a predetermined width, the upper portion of said shield being provided with air passage means to admit air, said generating means having a nozzle positioned sufficiently below the upper portion of said shield to create a suction when said paint is being sprayed, the suction created drawing air into the interior of said shield for confining the paint spray in its passage through said shield.*

*11. In a traffic lane marking machine, means for generating a spray of paint, said generating means being carried by said machine a predetermined distance from a surface to be marked, a spacer having openings formed therein secured to said generating means in coaxial relation therewith, and a tubular shield engaging said spacer, said spacer being fixed on the inner circumference of said tubular shield at the upper end thereof, said tubular shield being of sufficient length to confine and restrict the spray of paint within the shield, the bottom edge of said shield forming a well defined lateral outline so as to form, upon forward movement of the machine, a ribbon of paint having well defined lateral edges and of substantially equal*

*hue, said openings in said spacer providing for the introduction of air into said tubular shield, the air drawn into said tubular shield through said openings aiding in confining the paint spray therein and driving the same thereout.*

References Cited in the file of this patent or the original patent

UNITED STATES PATENTS

| | | |
|---|---|---|
| 1,720,273 | Henry | July 9, 1929 |
| 1,741,169 | Thompson | Dec. 31, 1929 |
| 2,026,678 | Hefner | Jan. 7, 1936 |
| 2,076,172 | Bowden | Apr. 6, 1937 |
| 2,086,183 | Gellner | July 6, 1937 |
| 2,401,431 | Lewis | June 4, 1946 |
| 2,438,471 | Ball | Mar. 23, 1948 |
| 2,515,865 | Fisher | July 18, 1950 |
| 2,518,952 | Sohmer | Aug. 15, 1950 |
| 2,561,432 | Tranter | July 24, 1951 |
| 2,673,090 | Blumberg | Mar. 23, 1954 |